United States Patent
Hatchett et al.

(10) Patent No.: US 12,509,359 B2
(45) Date of Patent: Dec. 30, 2025

(54) STOICHIOMETRIC RECOVERY OF UF4 FROM UF6 DISSOLVED IN IONIC LIQUIDS

(71) Applicant: THE BOARD OF REGENTS OF THE NEVADA SYSTEM OF HIGHER EDUCATION ON BEHALF OF THE UNIVERSITY OF NEVADA, LAS VEGAS, Las Vegas, NV (US)

(72) Inventors: David W. Hatchett, Las Vegas, NV (US); Cassara J. Higgins, Las Vegas, NV (US)

(73) Assignee: THE BOARD OF REGENTS OF THE NEVADA SYSTEM OF HIGHER EDUCATION ON BEHALF OF THE UNIVERSITY OF NEVADA, LAS VEGAS, Las Vegas, NV (US)

( * ) Notice: Subject to any disclaimer, the term of this patent is extended or adjusted under 35 U.S.C. 154(b) by 717 days.

(21) Appl. No.: 17/795,686

(22) PCT Filed: Mar. 5, 2021

(86) PCT No.: PCT/US2021/021015
§ 371 (c)(1),
(2) Date: Jul. 27, 2022

(87) PCT Pub. No.: WO2021/178751
PCT Pub. Date: Sep. 10, 2021

(65) Prior Publication Data
US 2023/0107668 A1   Apr. 6, 2023

Related U.S. Application Data

(60) Provisional application No. 62/986,059, filed on Mar. 6, 2020.

(51) Int. Cl.
C01G 43/06       (2006.01)
C01G 43/00       (2006.01)

(52) U.S. Cl.
CPC ........... *C01G 43/06* (2013.01); *C01G 43/003* (2013.01); *C01G 43/066* (2013.01)

(58) Field of Classification Search
CPC ..... C01G 43/06; C01G 43/003; C01G 43/066
See application file for complete search history.

(56) References Cited

U.S. PATENT DOCUMENTS 3,330,742 A    7/1967   Piper
3,353,929 A   11/1967   Knacke et al.
(Continued)

FOREIGN PATENT DOCUMENTS

CA            635334 A    1/1962
CN         108179432 A    6/2018
(Continued)

OTHER PUBLICATIONS

K. Binnemans. "Lanthanides and Actinides in Ionic Liquids," Chem. Rev. 2007, 107, 6, 2592-2614. https://doi.org/10.1021/cr050979c (Year: 2007).*

(Continued)

*Primary Examiner* — Michael Forrest
*Assistant Examiner* — Nicholas A. Piro
(74) *Attorney, Agent, or Firm* — Michael Best & Friedrich LLP (57) ABSTRACT

Described herein are methods for recovering uranium tetrafluoride ($UF_4$) from uranium hexafluoride ($UF_6$) by directly dissolving $UF_6$ in ionic liquids and recovering $UF_4$, which can be processed to obtain $UO_2$ (s) or uranium metal.

14 Claims, 7 Drawing Sheets

(56) References Cited

U.S. PATENT DOCUMENTS

| | | | |
|---|---|---|---|
| 3,967,235 | A | 6/1976 | Dennis et al. |
| 4,769,180 | A | 9/1988 | Echigo et al. |
| 7,172,741 | B2 | 2/2007 | Kawamura et al. |
| 9,217,189 | B2 | 12/2015 | Davidson et al. |
| 9,382,632 | B2 | 7/2016 | Garcia-Diaz et al. |
| 9,631,290 | B2 | 4/2017 | Hatchett et al. |
| 11,427,480 | B2 | 8/2022 | Hatchett et al. |
| 2004/0170550 | A1 | 9/2004 | Kawamura et al. |
| 2013/0087464 | A1 | 4/2013 | Hatchett et al. |
| 2013/0233716 | A1 | 9/2013 | Hatchett et al. |
| 2014/0070434 | A1 | 3/2014 | Visser et al. |
| 2014/0374272 | A1 | 12/2014 | Garcia-Diaz |
| 2017/0306514 | A1 | 10/2017 | Hatchett et al. |
| 2018/0030576 | A1 | 2/2018 | Urza |

FOREIGN PATENT DOCUMENTS

| | | |
|---|---|---|
| FR | 2125495 A1 | 9/1972 |
| JP | H11223698 A | 8/1999 |
| JP | 2001174590 A | 6/2001 |
| JP | 2002055196 A | 2/2002 |
| JP | 2009036617 A | 2/2009 |
| JP | 2011107156 A | 6/2011 |
| JP | 2016008891 A | 1/2016 |
| WO | 2014124428 A1 | 8/2014 |
| WO | 2015059777 A1 | 4/2015 |
| WO | 2020204879 A1 | 10/2020 |

OTHER PUBLICATIONS

Koichiro Takao, Thomas James Bell, Yasuhisa Ikeda. "Actinide Chemistry in Ionic Liquids," Inorg. Chem. 2013, 52, 7, 3459-3472. https://doi.org/10.1021/ic300807v (Year: 2013).*

P. K. Mohapatra. "Actinide ion extraction using room temperature ionic liquids: opportunities and challenges for nuclear fuel cycle applications," Dalton Trans., 2017,46, 1730-1747. DOI https://doi.org/10.1039/C6DT04898F (Year: 2017).*

F. Joly, P. Simon, X. Trivelli, M. Arab, B. Morel, P. L. Solari, J.-F. Paul, P. Moisy, and C. Volkringer. "Direct conversion of uranium dioxide UO2 to uranium tetrafluoride UF4 using the fluorinated ionic liquid [Bmim][PF6]," Dalton Trans., 2020, 49, 274-278. DOI: 10.1039/c9dt04327f (Year: 2019).*

English machine translation of JP2011107156A. (Year: 2011).*

English machine translation of WO2015059777 A1. (Year: 2015).*

Canadian Patent Office Action for Application No. 3,170,598, dated Sep. 3, 2024 (3 pages).

European Patent Office Extended European Search Report for Application No. 21763702.4, mailed on Jan. 23, 2024 (8 pages).

Frajndlich. E. U. C., et al. "Alternative route for UF6 conversion towards UF4 to produce metallic uranium." Proceedings of the XXI International Meeting on Reduced Enrichment for Research and Test Reactors, São Paulo, Brazil. 1998 (10 pages).

Cannes, C., et al. "Specific interaction between uranium anionic complexes and the cations of bis (trifluoromethylsulfonyl) imide based ionic liquids." Inorganic Chemistry 52.19 (2013): 11218-11227.

Chinese Patent Office Notification of Second Office Action for application 201980094825.5, dated Jul. 29, 2023 (10 pages with translation).

Canadian Patent Office Action for Application No. 3,170,598, dated Oct. 19, 2023 (3 pages).

European Patent Office Extended European Search Report for application 19923183.8, mailed on Nov. 10, 2022 (7 pages).

McNeese, Leesa E., and C. D. Scott. Reconstitution of MSR Fuel by Reducing UF6 Gas to UF4 in a Molten Salt. No. ORNL-TM-1051. Oak Ridge National Lab.(ORNL), Oak Ridge, TN (United States), 1965 (21 pages).

International Preliminary Report on Patentability for Application No. PCT/US2021/021015 dated Sep. 6, 2022 (5 pages).

International Search Report and Written Opinion for Application No. PCT/US21/21015 dated Nov. 4, 2021 (13 pages).

Lide, CRC Handbook of Chemistry and Physics, 76th Ed, 1995, pp. 8-23.

Rogers et al., editors, Green Industrial Applications of Ionic Liquids, NATO Science Series, 2002, vol. 92, 563 pages.

Ohashi et al., "Feasibility studies on electrochemical recovery of uranium from solid wastes contaminated with uranium using 1-butyl-3-methylimidazorium chloride as an electrolyte", Journal of Nuclear Materials, 2015, vol. 464, pp. 119-127.

Shen et al., "Environmentally Friendlier Approach to Nuclear Industry: Recovery of Uranium from Carbonate Solutions Using Ionic Liquids", Industrial & Engineering Chemistry Research, 2015, vol. 54, No. 34, pp. 8624-8628.

Rao et al., "Electrodeposition of metallic uranium at near ambient conditions form room temperature ionic liquid", Journal of Nuclear Materials, 2011, vol. 408, No. 1, pp. 25-29.

* cited by examiner

STOICHIOMETRIC RECOVERY OF UF4 FROM UF6 DISSOLVED IN IONIC LIQUIDS

CROSS REFERENCE TO RELATED APPLICATIONS

This application is a U.S. national stage entry of International Patent Application No. PCT/US2021/021015, filed on Mar. 5, 2021, which claims priority to U.S. Provisional Patent Application No. 62/986,059, filed on Mar. 6, 2020, which are incorporated by reference herein in their entirety.

TECHNICAL FIELD

Described herein are methods for recovering uranium tetrafluoride ($UF_4$) from uranium hexafluoride ($UF_6$) by directly dissolving $UF_6$ in ionic liquids and recovering $UF_4$, which can be processed to obtain $UO_2$ (s) or uranium metal.

BACKGROUND

Uranium hexafluoride ($UF_6$) is a highly volatile and reactive form of uranium that is part of the national stockpile of nuclear materials. Ninety-five percent of the worldwide depleted uranium is in the form of $UF_6$. $UF_6$ reacts violently with water producing uranyl fluoride ($UO_2F_2$) and hydrofluoric acid (HF) and is extremely volatile and sublimes at room temperature.

There is a need for methods to convert reactive $UF_6$ into more stable uranium compounds that can be utilized in subsequent applications.

SUMMARY

One embodiment described herein is a method for converting uranium hexafluoride ($UF_6$) to uranium tetrafluoride ($UF_4$), comprising dissolving $UF_6$ directly into a room temperature ionic liquid at concentrations of 0.01 M to 3.0 M; incubating the solution for a period of time; and adding water to the solution to precipitate solid $UF_4$. In one aspect, the $UF_6$ concentration in the ionic liquid is less than about 2.0 M. In another aspect, the $UF_6$ concentration in the ionic liquid is about 0.01 M, about 0.02 M, about 0.03 M, about 0.04 M, about 0.05 M, about 0.06 M, about 0.07 M, about 0.08 M, about 0.09 M, 0.01 M, about 0.02 M, about 0.03 M, about 0.04 M, about 0.05 M, about 0.06 M, about 0.07 M, about 0.08 M, about 0.09 M, about 0.1 M, about 0.2 M, about 0.3 M, about 0.4 M, about 0.5 M, about 0.6 M, about 0.7 M, about 0.8 M, about 0.9 M, about 1.0 M, about 1.1 M, about 1.2 M, about 1.3 M, about 1.4 M, about 1.5 M, about 1.6 M, about 1.7 M, about 1.8 M, about 1.9 M, about 2.0 M, about 2.1 M, about 2.2 M, about 2.3 M, about 2.4 M, about 2.5 M, or about 3.0 M. In another aspect, the method further comprises chilling the $UF_6$ prior to dissolving the $UF_6$ in the ionic liquid. In another aspect, the period of time comprises about 1 hour to about 200 days. In another aspect, the period of time comprises about 1 hour to about 1 day. In another aspect, the ionic liquid comprises an anion with a lone pair of electrons. In another aspect, the ionic liquid comprises an anion selected from the group consisting of n-bis(trifluoromethanesulfonylimide) (TFSI), dicyanomide, trifluoroacetate, alkyl sulfonates, alkyl sulfates, bis(fluorosulfonyl)imide and trifluoromethylacetate. In another aspect, the ionic liquid comprises n-bis(trifluoromethanesulfonylimide) anion ($TFSI^-$). In another aspect, the ionic liquid comprises a cation selected from the group consisting of alkyl-substituted or unsubstituted ammonium cations, alkyl-substituted or unsubstituted piperidinium cations, and alkyl-substituted or unsubstituted pyrrolidinium cations. In another aspect, the ionic liquid comprises a cation selected from the group consisting of tetraalkylammonium cation, a dialkylpiperidinium cation, and dialkylpyrrolidinium cation. In another aspect, the ionic liquid comprises 1-methyl-1-propyl piperidinium cation. In another aspect, the ionic liquid comprises 1-methyl-1-propyl piperidinium bis(trifluoromethanesulfonylimide) ([MPPi][TFSI]). In another aspect, the recovery of $UF_4$ is approximately 100%.

Another embodiment is $UF_6^{2-}$ produced using the any of the methods described herein.

Another embodiment is $UF_4$ produced using the any of the methods described herein.

Another embodiment is uranium metal, or a uranium oxide produced using the any of the methods described herein.

Another embodiment is a method for producing $UF_6^{2-}$ comprising dissolving $UF_6$ directly into a room temperature ionic liquid at concentrations of 0.01 M to 2.5 M and incubating the solution for a period of time. In one aspect, the method further comprises chilling the $UF_6$ prior to dissolving the $UF_6$ in the ionic liquid. In another aspect, the period of time comprises about 1 hour to about 200 days. In another aspect, the period of time comprises about 1 hour to about 1 day. In another aspect, the ionic liquid comprises an anion with a lone pair of electrons. In another aspect, the ionic liquid comprises an anion selected from the group consisting of n-bis(trifluoromethanesulfonylimide) (TFSI), dicyanomide, trifluoroacetate, alkyl sulfonates, alkyl sulfates, bis(fluorosulfonyl)imide and trifluoromethylacetate. In another aspect, the ionic liquid comprises n-bis(trifluoromethanesulfonylimide) anion ($TFSI^-$). In another aspect, the ionic liquid comprises a cation selected from the group consisting of alkyl-substituted or unsubstituted ammonium cations, alkyl-substituted or unsubstituted piperidinium cations, and alkyl-substituted or unsubstituted pyrrolidinium cations. In another aspect, the ionic liquid comprises a cation selected from the group consisting of tetraalkylammonium cation, a dialkylpiperidinium cation, and dialkylpyrrolidinium cation. In another aspect, the ionic liquid comprises 1-methyl-1-propyl piperidinium cation. In another aspect, the ionic liquid comprises 1-methyl-1-propyl piperidinium bis(trifluoromethanesulfonylimide) ([MPPi][TFSI]).

Another embodiment is $UF_6^{2-}$ produced using the any of the methods described herein.

Another embodiment is $UF_4$ produced using the any of the methods described herein.

Another embodiment is uranium metal, or a uranium oxide produced using the any of the methods described herein.

DESCRIPTION OF THE DRAWINGS

FIG. 1A-3C.

FIGS. 5A-C.

FIGS. 6A-C.

DETAILED DESCRIPTION

Described herein are methods for recovering uranium tetrafluoride (UF$_4$) from uranium hexafluoride (UF$_6$) by directly dissolving UF$_6$ in ionic liquids and recovering UF$_4$, which can be processed to obtain UO$_2$ (s) or uranium metal.

Uranium hexafluoride (UF$_6$) is a highly volatile and reactive form of uranium that is part of the national stockpile of nuclear materials. Previously work addressed methods for converting reactive UF$_6$ into more stable material because UF$_6$ sublimes at room temperature and reacts violently with water to produce uranyl fluoride (UO$_2$F$_2$) and HF. See International Patent Application No. PCT/US2019/024870, filed on Mar. 29, 2019, which is incorporated by reference for such teachings. As described therein, the direct dissolution of uranium hexafluoride was documented in ionic liquid (IL). Stochiometric amounts of uranium hexafluoride (UF$_6$) were dissolved directly into IL and chemically converted to uranium tetrafluoride, UF$_4$. The dissolution occurs through a spontaneous chemical process that involves the reduction of uranium hexafluoride by the ionic liquid anion. The resulting product is UF$_4$, which is very stable and relative benign as compared to the reactive and volatile UF$_6$. The complete recovery of uranium from IL as UF$_4$ is described herein. UF$_4$ can then be utilized in different processes to obtain UO$_2$ (s) or uranium metal using processes known in the art. The process described herein is ~100% efficient in terms of materials recovery for uranium metal. The process provides a novel, safe, path for the conversion of uranium hexafluoride to more useful uranium materials.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of," and "consisting essentially of" the embodiments or elements presented herein, whether explicitly set forth or not.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

For purposes of this disclosure, the chemical elements are identified in accordance with the Periodic Table of the Elements, CAS version, *Handbook of Chemistry and Physics*, 75$^{th}$ ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March, *March's Advanced Organic Chemistry*, 5$^{th}$ ed., John Wiley & Sons, Inc., New York, 2001; Larock, *Comprehensive Organic Transformations*, VCH Publishers, Inc., New York, 1989; Carruthers, *Some Modern Methods of Organic Synthesis*, 3$^{rd}$ ed., Cambridge University Press, Cambridge, 1987; the entire contents of each are incorporated herein by reference.

The term "alkyl," as used herein, means a straight or branched, saturated hydrocarbon chain. Representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, 4,4-dimethylpentan-2-yl, n-heptyl, n-octyl, n-nonyl, and n-decyl.

The term "substituted" refers to a group that may be further substituted with one or more non-hydrogen substituent groups. For example, alkyl-substituted ammonium cations refer to an ammonium group, which may be substituted with at least one alkyl group, as described herein. In some embodiments, a group may be substituted with two alkyl groups, such that it is dialkyl substituted, or four alkyl group, such that it is tetraalkyl substituted.

The term "ionic liquid" or "IL" refers to a salt that melts at a relatively low temperature. An ionic liquid is essentially a salt in the liquid state. Some ionic liquids are room temperature ionic liquids or "RTILs" which indicates they are liquids at room temperature. While ordinary liquids such as water and gasoline are predominantly made of electrically neutral molecules, ionic liquids are largely made of ions and ion pairs (i.e., cations and anions). The physical properties of an IL vary with the identity of the cation/anion species. Any salt that melts without decomposing or vaporizing can usually yield an ionic liquid. Sodium chloride (NaCl), for example, melts at 801° C. (1,474° F.) into a liquid that consists largely of sodium cations (Na$^+$) and chloride anions (Cl$^-$).

In some embodiments, the ionic liquid comprises an anion selected from the group consisting of n-bis(trifluoromethanesulfonylimide) (TFSI), dicyanomide, acetates, trifluoroacetates, trifluormethylsulfonates, alkyl sulfonates, alkyl sulfates, bis(fluorosulfonyl)imide, trifluoromethylacetate, tetrafluoroborates, hexafluorophosphates, chlorides, nitrates, inter alia.

In some embodiments, the ionic liquid comprises a cation selected from the group consisting of tetraalkylammonium cations, a dialkylpiperidinium cation, dialkylpyrrolidinium, carboxy-N,N-trimethylethanamium (Hbet), 1-butyl-1-methylpyrrolidinium (BMPyrr), 1-propyl-1-methylpiperidinium (MPPi), 1-butyl-3-methylpiperidinium (C4MPIP), 3-butyl-1-methylimidazolium (BMIM), 3-ethyl-1-methylimidazolium (EMIM), and tri-n-octylmethylammonium (TOMA), inter alia.

Exemplary ionic liquids comprise butyltrimethylammonium n-bis(trifluoromethanesulfonylimide); 3-ethyl-1-methylimidazolium acetate; 3-butyl-1-methylimidazolium tetrafluoroborate; 3-butyl-1-methylimidazolium n-bis (trifluoromethanesulfonyl)imide; N-butyl-N-methylpyrrolidinium n-bis(trifluoromethanesulfonyl)imide; 1-methyl-1-propylpiperidinium n-bis(trifluoromethanesulfonylimide); or 1-methyl-1-propylpyrrolidinium n-bis(trifluoromethanesulfonylimide); inter alia.

Methods

The present disclosure provides methods for recovering uranium tetrafluoride ($UF_4$) from uranium hexafluoride ($UF_6$) by dissolving the $UF_6$ in an ionic liquid:

When $UF_6$ was dissolved ionic liquid, evidence of a reduction was observed by the transition from a white solid to a green solution. Higher concentration samples formed a green precipitate. Without being bound by theory, a potential mechanism for the dissolution was hypothesized as shown in Scheme 1:

Scheme 1

Characterization of the dissolved uranium species using UV-Vis, FTIR, and XAFS indicates that the uranium is rapidly reduced to $U_{(V)}$ (uranium V) in the form of $UF_6^-$. The reduction is facilitated through the oxidation of the ionic liquid anion (e.g., TFSI$^-$), which has been reported to be a stable free radical. A second electron transfer appears to occur over time to produce a $U_{(IV)}$ (uranium IV) anion, $UF_6^{2-}$. See Scheme 1.

The uranium species can be recovered by adding water to the dissolved $UF_6$ solution to precipitate $UF_4$ and recover 70% if the uranium dissolved in ionic liquid. The inclusion of water removes residual F$^-$ and the remaining 30% of U in the form of $UO_2^{2+}$ such that less than 0.3% of the soluble uranium remains in the ionic liquid. Characterization of the solids recovered from the ionic liquid indicates the uranium species obtained from the dissolved $UF_6$ is the hydrated $UF_4$ species (100%) based on X-ray Powder Diffraction (XRPD). The remaining $UO_2^{2+}$ was precipitated from the aqueous solution using a simple reductant such as Iron(II) chloride or a mixture of Iron(II/III) hydroxide to fully recover the soluble uranium as $UO_2$ (s). Additionally, uranium metal can be recovered from the precipitated $UF_4$ by methods known in the art. A potential mechanism for the reaction of $UF_6^-$ ionic liquid solution with water to yield $UF_4$ is shown in Scheme 2:

Scheme 2

As described herein, the method to recover uranium comprises dissolving uranium hexafluoride ($UF_6$) directly into an ionic liquid at concentrations of about 0.01 M to about 3.0 M to form a solution in an ionic liquid solution and incubating the solution for a period of time. The method may further comprise chilling the $UF_6$ prior to dissolving the $UF_6$ in the ionic liquid.

In one embodiment, the concentration of uranium hexafluoride ($UF_6$) in the ionic liquid solvent is less than 0.01 M; less than 0.05 M; less than 0.1 M; less than 0.5 M; less than 1.0 M, less than 1.5 M, less than 2.0 M, or less than 2.5 M. In one aspect, the concentration of uranium hexafluoride ($UF_6$) in the ionic liquid solvent is about 0.01 M to about 1 M; about 0.01 M to 0.5 M; about 0.01 M to 0.4 M; about 0.1 M to about 1 M; about 0.1 M to about 0.5 M; about 0.1 M to about 0.4 M; about 0.1 M to about 0.6 M; about 0.1 to about 2.0 M, or about 0.1 to about 2.5 M. In one aspect, the concentration of uranium hexafluoride ($UF_6$) in the ionic liquid solvent is about 0.01 M, about 0.02 M, about 0.03 M, about 0.04 M, about 0.05 M, about 0.06 M, about 0.07 M, about 0.08 M, about 0.09 M, 0.01 M, about 0.02 M, about 0.03 M, about 0.04 M, about 0.05 M, about 0.06 M, about 0.07 M, about 0.08 M, about 0.09 M, about 1.0 M, about 1.1 M, about 1.2 M, about 1.3 M, about 1.4 M, about 1.5 M, about 1.6 M, about 1.7 M, about 1.8 M, about 1.9 M, about 2.0 M, about 2.1 M, about 2.2 M, about 2.3 M, about 2.4 M, about 2.5 M, or about 3.0 M.

The ionic liquid may be any combination of cation and anion. The combination of cation and anion may be chosen to influence the properties of the solution as necessary for optimization in the methods described herein. The ionic liquid may be a room temperature ionic liquid (RTIL). RTILs are those liquid at room temperature. RTILs have similar electrochemical properties of other ionic liquids without the need for elevated temperatures.

The ionic liquid may be a simple ionic liquid, containing one type of cation with one type of anion. The ionic liquid may be a complex or mixed ionic liquid, containing several types of anions and cations or double salts.

The ionic liquid may comprise an anion with a lone pair of electrons. In some embodiments, the anion is selected from the group consisting of n-bis(trifluoromethanesulfonylimide) (TFSI), dicyanomide, trifluoroacetate, alkyl sulfonates, alkyl sulfates, bis(fluorosulfonyl)imide, and trifluoromethylacetate. In one exemplary embodiment, the ionic liquid comprises a n-bis(trifluoromethanesulfonylimide) (TFSI) anion.

The ionic liquid may comprises a cation selected from the group consisting of tetraalkylammonium cations, a dialkylpiperidinium cation, dialkylpyrrolidinium, carboxy-N,N-trimethylethanam ium (Hbet), 1-butyl-1-methylpyrrolidinium (BMPyrr), 1-methyl-1-propyl piperidinium (MPPi), 1-butyl-3-methylpiperidinium (C4MPIP), 3-butyl-1-methylimidazolium (BMIM), 3-ethyl-1-methylimidazolium (EMIM), and tri-n-octylmethylammonium (TOMA), inter alia.

Exemplary ionic liquids comprise butyltrimethylammonium n-bis(trifluoromethanesulfonylimide); 3-ethyl-1-methylimidazolium acetate; 3-butyl-1-methylimidazolium tetrafluoroborate; 3-butyl-1-methylimidazolium n-bis(trifluoromethanesulfonyl)imide; N-butyl-N-methylpyrrolidinium n-bis(trifluoromethanesulfonyl)imide; 1-methyl-1-propylpiperidinium n-bis(trifluoromethanesulfonylimide); or 1-methyl-1-propylpyrrolidinium n-bis(trifluoromethanesulfonylimide); inter alia.

In one exemplary embodiment, the ionic liquid is 1-methyl-1-propyl-methylpiperidinium n-bis(trifluoromethanesulfonylimide).

After dissolving uranium hexafluoride ($UF_6$) directly into an ionic liquid, the solution is incubated for a period of time. The period of time can be for 1 hour to 1500 days. In one aspect the time period is 1 h, 2 h, 3 h, 4 h, 5 h, 6 h, 7 h, 8 h, 9 h, 10 h, 11 h, 12 h, 13 h, 14 h, 15 h, 16 h, 17 h, 18 h, 19 h, 20 h, 21 h, 22 h, 23 h, 24 h; 1 day, 2 days, 5 days, 10 days, 20 days, 30 days, 45 days, 60 days, 90 days, 180 days, 210 days, 1 year, 2 years, 5 years, or even longer. In one aspect the period of time is 0.5 h to 2 h; 1 h to 12 h; 1 h to 24 h, 8 h to 16 h, 8 h to 24 h; 0.5-1 day, 1-2 days, 2-5 days, 1-15 days, 1-30 days, 1-45 days, 1-60 days, 1-90 days, 1-180 days, 1-365 days, or for 1-5 years, including all integers within the specified ranges and their end points.

The incubation can be conducted at a specific temperature. In one aspect, the incubation can be conducted at ambient temperature or in the range of 1° C. to 100° C., including all integers within the specified range and the end points. In one aspect, the incubation is conducted at room temperature, ~25° C. Without being bound by any theory, the initial reaction temperature is dictated by the exothermic nature of the ionic liquid; accordingly, higher concentrations of $UF_6$ are dissolved more rapidly owing to the increased temperature of dissolution.

The incubation can be conducted in air or under an atmosphere of an inert gas such as nitrogen, argon, helium, and the like. The incubation can be conducted at standard atmospheric pressure, in vacuo, or under high pressure, such as 1-10 bar (~100 kPa to ~1000 kPa). In one aspect, the incubation is performed in air at standard atmospheric pressure (~100 kPa).

It will be apparent to one of ordinary skill in the relevant art that suitable modifications and adaptations to the compositions, formulations, methods, processes, and applications described herein can be made without departing from the scope of any embodiments or aspects thereof. The compositions and methods provided are exemplary and are not intended to limit the scope of any of the specified embodiments. All of the various embodiments, aspects, and options disclosed herein can be combined in any variations or iterations. The scope of the compositions, formulations, methods, and processes described herein include all actual or potential combinations of embodiments, aspects, options, examples, and preferences herein described. The exemplary compositions and formulations described herein may omit any component, substitute any component disclosed herein, or include any component disclosed elsewhere herein. All methods described herein can be performed in any suitable order unless otherwise indicated herein or otherwise clearly contradicted by context. The ratios of the mass of any component of any of the compositions or formulations disclosed herein to the mass of any other component in the formulation or to the total mass of the other components in the formulation are hereby disclosed as if they were expressly disclosed. Should the meaning of any terms in any of the patents or publications incorporated by reference conflict with the meaning of the terms used in this disclosure, the meanings of the terms or phrases in this disclosure are controlling. Furthermore, the foregoing discussion discloses and describes merely exemplary embodiments. All patents and publications cited herein are incorporated by reference herein for the specific teachings thereof.

Various embodiments and aspects of the inventions described herein are summarized by the following clauses:

Clause 1. A method for converting uranium hexafluoride ($UF_6$) to uranium tetrafluoride ($UF_4$), comprising dissolving $UF_6$ directly into a room temperature ionic liquid at concentrations of 0.01 M to 3.0 M; incubating the solution for a period of time; and adding water to the solution to precipitate solid $UF_4$.

Clause 2. The method of clause 1, wherein the $UF_6$ concentration in the ionic liquid is less than about 2.0 M.

Clause 3. The method of clause 1 or 2, wherein the $UF_6$ concentration in the ionic liquid is about 0.01 M, about 0.02 M, about 0.03 M, about 0.04 M, about 0.05 M, about 0.06 M, about 0.07 M, about 0.08 M, about 0.09 M, 0.01 M, about 0.02 M, about 0.03 M, about 0.04 M, about 0.05 M, about 0.06 M, about 0.07 M, about 0.08 M, about 0.09 M, about 0.1 M, about 0.2 M, about 0.3 M, about 0.4 M, about 0.5 M, about 0.6 M, about 0.7 M, about 0.8 M, about 0.9 M, about 1.0 M, about 1.1 M, about 1.2 M, about 1.3 M, about 1.4 M, about 1.5 M, about 1.6 M, about 1.7 M, about 1.8 M, about 1.9 M, about 2.0 M, about 2.1 M, about 2.2 M, about 2.3 M, about 2.4 M, about 2.5 M, or about 3.0 M.

Clause 4. The method of any one of clauses 1-3, further comprising chilling the $UF_6$ prior to dissolving the $UF_6$ in the ionic liquid.

Clause 5. The method of any one of clauses 1-4, wherein the period of time comprises about 1 hour to about 200 days.

Clause 6. The method of any one of clauses 1-5, wherein the period of time comprises about 1 hour to about 1 day.

Clause 7. The method of any one of clauses 1-6, wherein the ionic liquid comprises an anion with a lone pair of electrons.

Clause 8. The method of any one of clauses 1-7, wherein the ionic liquid comprises an anion selected from the group consisting of n-bis(trifluoromethanesulfonylimide) (TFSI), dicyanomide, trifluoroacetate, alkyl sulfonates, alkyl sulfates, bis(fluorosulfonyl)imide and trifluoromethylacetate.

Clause 9. The method of any one of clauses 1-8, wherein the ionic liquid comprises n-bis(trifluoromethanesulfonylimide) anion ($TFSI^-$).

Clause 10. The method of any one of clauses 1-9, wherein the ionic liquid comprises a cation selected from the group consisting of alkyl-substituted or unsubstituted ammonium cations, alkyl-substituted or unsubstituted piperidinium cations, and alkyl-substituted or unsubstituted pyrrolidinium cations.

Clause 11. The method of any one of clauses 1-10, wherein the ionic liquid comprises a cation selected from the group consisting of tetraalkylammonium cation, a dialkylpiperidinium cation, and dialkylpyrrolidinium cation.

Clause 12. The method of any one of clauses 1-11, wherein the ionic liquid comprises 1-methyl-1-propyl piperidinium cation.

Clause 13. The method of any one of clauses 1-12, wherein the ionic liquid comprises 1-methyl-1-propyl piperidinium bis(trifluoromethanesulfonylimide) ([MPPi][TFSI]).

Clause 14. The method of any one of clauses 1-13, wherein the recovery of $UF_4$ is approximately 100%.

Clause 15. $UF_6^{2-}$ produced by the method of any of the preceeding clauses.

Clause 16. $UF_4$ produced by the method of any of the preceeding clauses.

Clause 17. Uranium metal or a uranium oxide produced using the method of any of the preceeding clauses.

Clause 18. A method for producing $UF_6^{2-}$ comprising dissolving $UF_6$ directly into a room temperature ionic liquid at concentrations of 0.01 M to 2.5 M and incubating the solution for a period of time.

Clause 19. The method of clause 18, further comprising chilling the $UF_6$ prior to dissolving the $UF_6$ in the ionic liquid.

Clause 20. The method of clause 18 or 19, wherein the period of time comprises about 1 hour to about 200 days.

Clause 21. The method of any one of clauses 18-20, wherein the period of time comprises about 1 hour to about 1 day.

Clause 22. The method of any one of clauses 18-21, wherein the ionic liquid comprises an anion with a lone pair of electrons.

Clause 23. The method of any one of clauses 18-22, wherein the ionic liquid comprises an anion selected from the group consisting of n-bis(trifluoromethanesulfonylimide) (TFSI), dicyanomide, trifluoroacetate, alkyl sulfonates, alkyl sulfates, bis(fluorosulfonyl)imide and trifluoromethylacetate.

Clause 24. The method of any one of clauses 18-23, wherein the ionic liquid comprises n-bis(trifluoromethanesulfonylimide) anion ($TFSI^-$).

Clause 25. The method of any one of clauses 18-24, wherein the ionic liquid comprises a cation selected from the group consisting of alkyl-substituted or unsubstituted ammonium cations, alkyl-substituted or unsubstituted piperidinium cations, and alkyl-substituted or unsubstituted pyrrolidinium cations.

Clause 26. The method of any one of clauses 18-25, wherein the ionic liquid comprises a cation selected from the group consisting of tetraalkylammonium cation, a dialkylpiperidinium cation, and dialkylpyrrolidinium cation.

Clause 27. The method of any one of clauses 18-26, wherein the ionic liquid comprises 1-methyl-1-propyl piperidinium cation.

Clause 28. The method of any one of clauses 18-27, wherein the ionic liquid comprises 1-methyl-1-propyl piperidinium bis(trifluoromethanesulfonylimide) ([MPPi][TFSI]).

Clause 29. $UF_6^{2-}$ produced by the method of any of the preceeding clauses.

Clause 30. $UF_4$ produced by the method of any of the preceeding clauses.

Clause 31. Uranium metal or a uranium oxide produced using the method of any of the preceeding clauses.

EXAMPLES

Example 1

Dissolution of Uranium Hexafluoride into [MPPi][TFSI]

The route for dissolution for the $UF_6$ was a direct solubilization of solid $UF_6$ material in [MPPi][TFSI] at a concentration of 0.1 M and 1.4 M. The $UF_6$ was stored in a sealed 10 mL tube. The tube was stored in a glove box freezer at $-15°$ C. to ensure the species was not volatile when used. The tube was placed into a jacketed well in the bottom of a VAC glove box filled with $LN_2$ and chilled to $LN_2$ temperatures for an hour. The tube was opened with the $UF_6$ chilled. While chilled, the $UF_6$ was chiseled out with a metal spatula and added directly to a scintillation vial with a measured amount of [MPPi][TFSI] at room temperature. The mass of the addition was calculated by the mass changes of the vial. As the $UF_6$ warms, it became waxy and was more difficult to remove from the tube. When this occurs, temporarily re-chilling the tube made it easier to remove. Freshly made solutions were stirred overnight to assist in the dissolution.

Example 2

Solution Characterization of $UF_6$ in Ionic Liquid

Figure 1A:
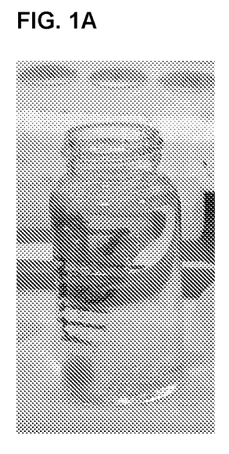
FIG. 1A shows a 0.1 M solution as addition occurred.
Figure 1B:
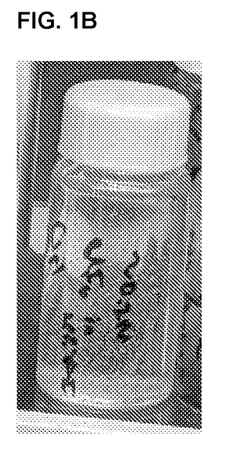
FIG. 1B shows the same solution after shaking and incubation for two days.
Figure 1C:
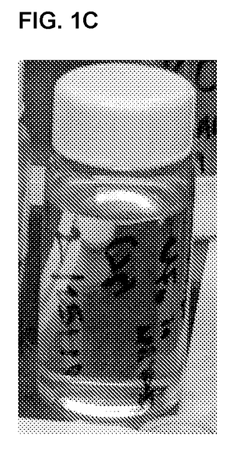

The $UF_6$ undergoes an immediate color change after addition to the [MPPi][TFSI]. The solid $UF_6$ is white. After addition to the IL, it turned yellow momentarily, before dissolving into an aquamarine solution (FIGS. 1A and B). Over the course of a day, the 0.1 M solution changed to a green color (FIG. 1C) and remains that color for an extended period of time (>150 days).

UV-Vis and FTIR

Figure 2:
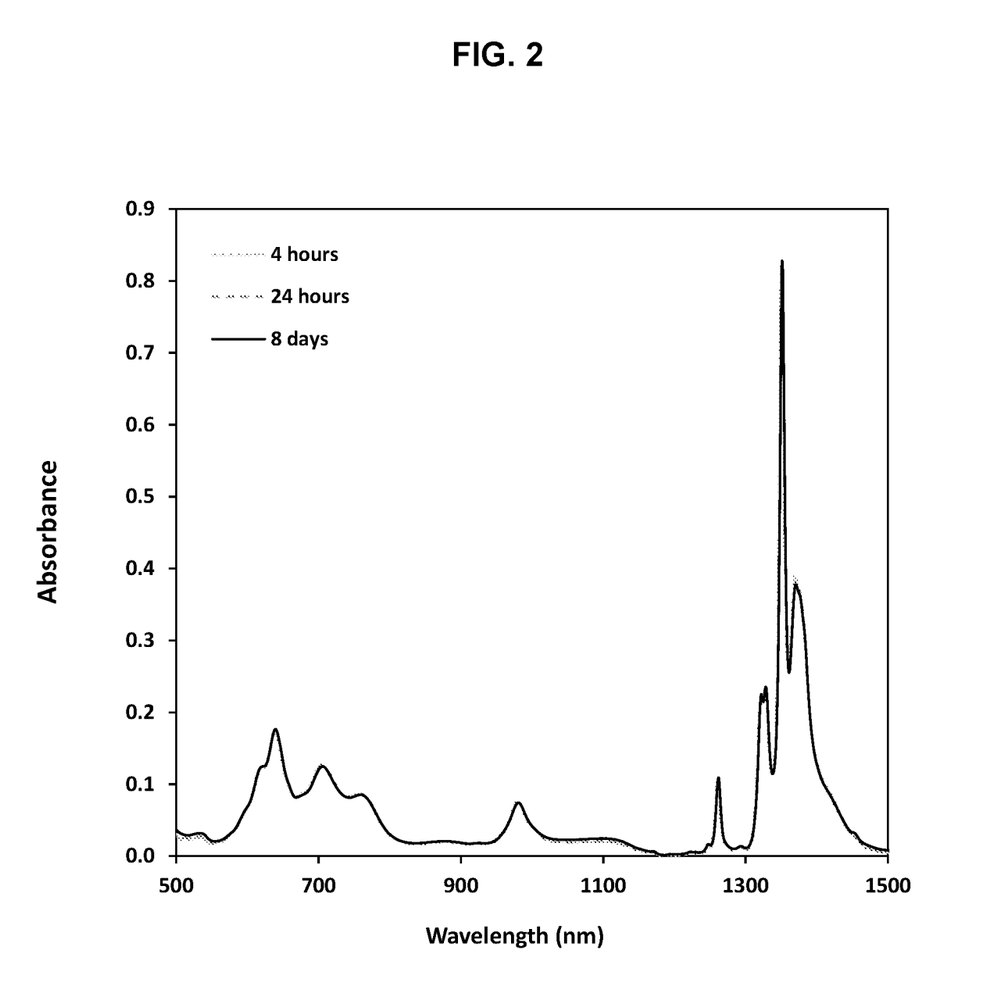
FIG. 2 shows UV-V is spectra over time of 0.1 M $UF_6$ in [MPPi][TFSI].

A spectroscopic study was conducted on a 0.1 M $UF_6$ [MPPi][TFSI] solution over time utilizing UV-Vis and FTIR. The dissolved $UF_6$ sample was pipetted into a 1 cm path-length quartz cuvette until it was at least 75% full. The cuvette was sealed with a screw-top cap. UV-Vis spectroscopy was performed daily (FIG. 2) but little change was observed in the UV-Vis over the short term, despite the color changes. The first measurement was taken 4 hours after adding the $UF_6$ to the [MPPi][TFSI]. In the first week, there were minimal changes, but the maximum of the 1350 nm peak decreases over time. The shoulder of the absorption in the ultraviolet region shifts. The peak at 600 to 800 nm remains relatively unchanged over the course of a week.

Figure 3:
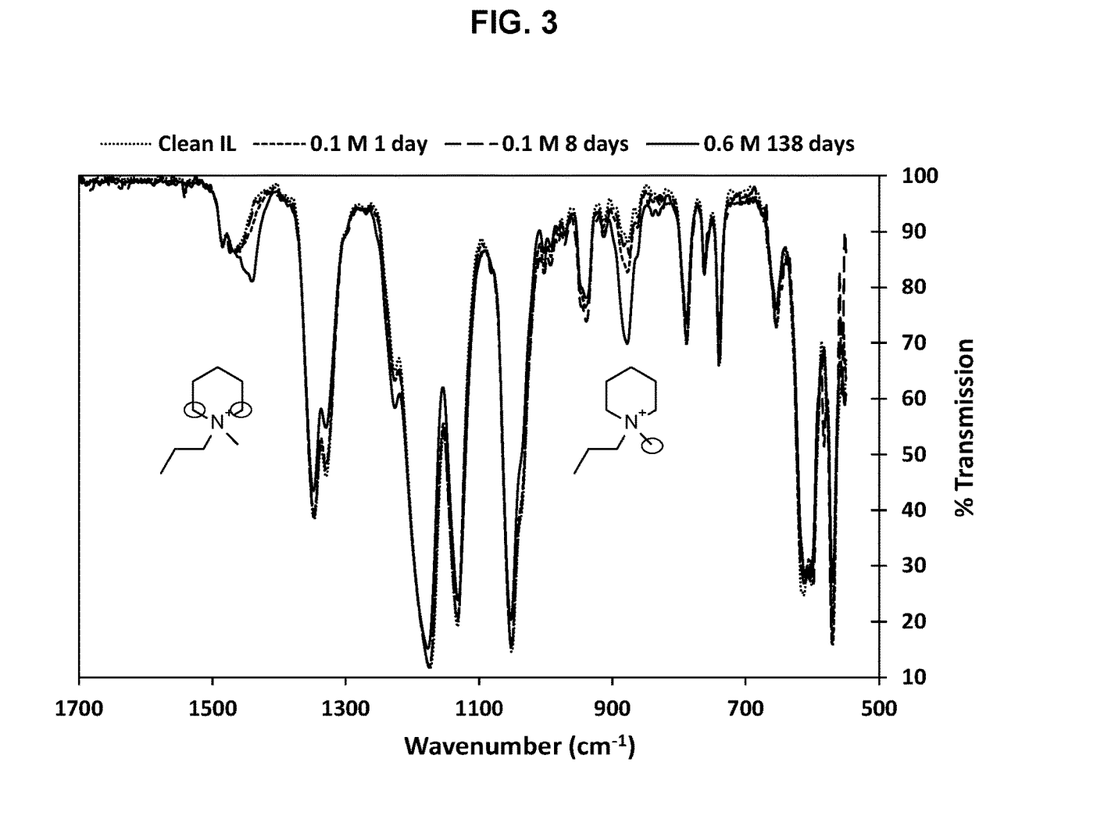
FIG. 3 shows IR spectra of $UF_6$ in [MPPi][TFSI] over time with peaks identified.

Infrared spectroscopy was used to analyze at the vibrational energies of the solution. The sample absorbed at wavelengths that resonate with stretching, rotational, or rocking stretches of the molecule. These absorbed frequencies changed as the structure of the molecule changes. The IR spectrum of the [MPPi][TFSI] with and without $UF_6$ changes overtime (FIG. 3). In the short term, there were few changes in the IR spectra. However, after extended periods of time, there were major shifts in the peak shapes at 1500 and 900 $cm^{-1}$. These changes were in the spectral range associated with chemical functional groups associated with the IL cation, [MPPi].

The long-term changes in the UV-Vis and FTIR are indicative of interactions between the dissolved UF6 and [MPPi][TFSI] over time. These interactions were slow to develop, likely due to the bulkiness of the cation and anion. However, over time, the electrostatic interactions dominate, and solubility of the resulting salt is low in the IL resulting in precipitation. The interaction between the cation and anion was observed in the FTIR peak around 1500 $cm^{-1}$, which, corresponds to the C—H stretch in piperazine, a six-member ring with two NH groups in the 1 and 4 position. The peak at about 1475 $cm^{-1}$ is likely the $CH_2$ groups adjacent to the N in the [MPPi] cation. The peak at 900 $cm^{-1}$ corresponds to the rocking of the methyl group of nitrogen. These changes indicate the coordination of the $UF_6$ with the cation in solution. [MPPi][TFSI] absorbs heavily in the UV range. The shift of the UV shoulder in the UV-Vis also indicates changes in interaction between the $UF_6$ and [MPPi][TFSI]. Computational calculations have been made for [MPPi][TFSI], UF6, $UF_6^-$, and $UF_6^{2-}$ to determine uranium oxidation state utilizing the FTIR spectrum. However, the absorption bands for $UF_6$ were minimal in comparison with the [MPPi][TFSI].

Example 3

X-Ray Absorption Fine Structure (XAFS)

To determine coordination, structure, and oxidation state of the uranium, XAFS on the $UF_6$ solution was performed. XAFS was conducted on two 100 mM $UF_6$ solutions at 10- and 169-days-old. The older sample showed 5.0±1 fluorine atoms at 2.04(2) Å from the uranium. There was also evidence of 3.1±0.6 sulfur atoms present at 3.38 Å, but further analysis is being performed on the sample and data. In the 10-day-old sample, there were 5.8±1.2 fluorine atoms at 2.05(2) Å and no other coordinating atoms. This supports previous evidence showing the kinetically slow coordination of the $UF_6$ with the [MPPi][TFSI]. The 2.05 Å U—F bond distance was more consistent with that found in $UF_6^-$ species (i.e., 2.03(2) Å in (PPN)($UF_6$)) than observed with $UF_6^{2-}$ species (i.e., 2.16(2) Å in $(TEA)_2UF_6$). This suggests that the $UF_6$ compound is $U_{(V)}$ while in the ionic liquid. The XAFS and XANES results are listed in Table 1.

TABLE 1

XAFS Results on $UF_6$ samples at the U-L3 edge

| Sample | XANES Edge (eV) | White line (eV) | U oxidation state |
|---|---|---|---|
| 10-day-old 100 mM | 17166.2 | 17174.0 | +4 or +5 |
| 169-day-old 100 mM | 17166.1 | 17173.6 | +4 or +5 |
| 169-day-old 700 mM | 17164.0 | 17174.2 | +4 or +5 |
| $UF_4$ Standard | 17166.0 | 17170.0 | +4 |

Figure 4:
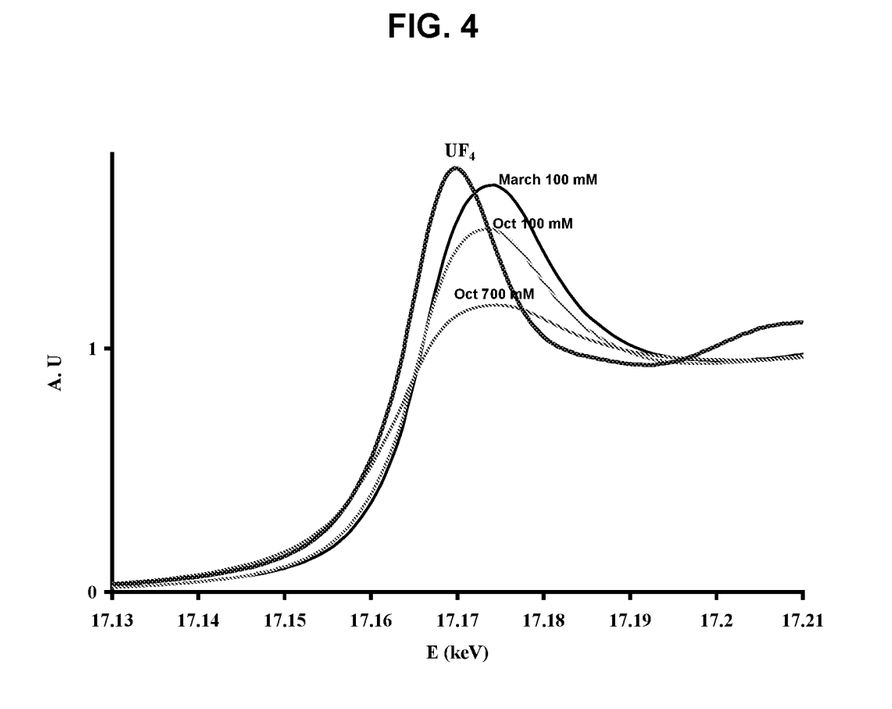
FIG. 4 shows a normalized XANES spectra at the U-L3 edge of $UF_4$; 169-day-old 700 mM $UF_6$; 169-day-old 100 mM $UF_6$; and 10-day-old 100 mM $UF_6$.

The normalized XANES data shown in FIG. 4 for a standard $UF_4$ sample and the dissolved species in IL. When looking at the XANES for the 169- and 10-day-old samples, the position of absorption edge and white-line were similar. This suggested they were all the same oxidation state. However, it was unclear if the uranium is in the 4+ or 5+ oxidation state. A $UF_4$ solid sample was taken as a reference material for the 4+ state, but no 5+ uranium samples were used as a reference. The differences in the peak shape of the normalized XANES in the 169- and 10-day-old 100 mM samples indicated that the coordination of the uranium is different in each of these samples.

The third sample in FIG. 4 is the 169-day-old 700 mM $UF_6$ sample. This sample had a precipitate at the bottom of the vial that the solution was taken from. This sample shows having 6.5±1.3 U—F bonds at 2.06(2) Å. The XANES peak shape also further indicated a different coordination around the U.

A second set of XAFS experiments are in progress using new solutions and several reference materials of various oxidation states. Computational studies are also being conducted to simulate the system to confirm the 4+/5+ oxidation state of the uranium in solution.

Example 4

Characterization of $UF_6$ Precipitates from RTIL

Figure 5A:
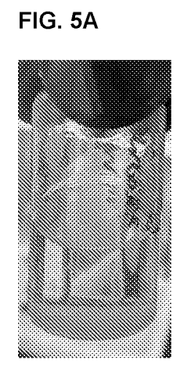
FIG. 5A shows 0.95 M $UF_6$ in [MPPi][TFSI] immediately after addition.
Figure 5B:
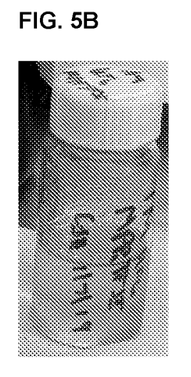
FIG. 5B shows the same solution after 24 hours.
Figure 5C:
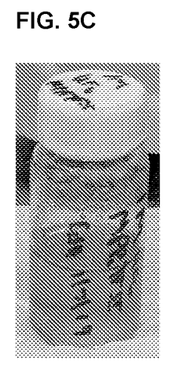
FIG. 5C shows the solution after 8 days.

Precipitation occurs in $UF_6$ solutions even in low concentration samples (under 0.5 M $UF_6$). Therefore, a high concentration 0.95 M solution was produced to observe color changes and to confirm the formation of salt in the form of the cation/anion (IL/$UF_6^{2-}$) precipitate. A similar color change pattern is observed to that of the low concentration sample (FIG. 5). The dissolution of the $UF_6$ is exothermic, and heat could be felt through the glovebox gloves when producing high concentration samples. The heating of the solution accelerates the dissolution of the $UF_6$ as well diminishing the need to stir the solution. Initially the $UF_6$ is dissolved into a blue solution that turns green over the course of a week.

Example 5

Aqueous Recovery of Uranium from RTIL

Figure 6A:
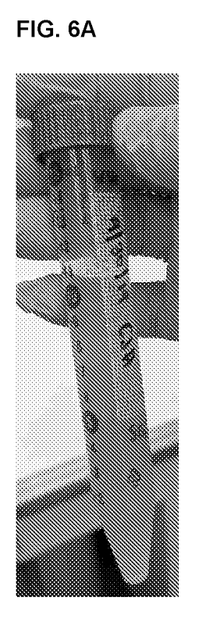
FIG. 6A shows UF$_6$ in [MPPi][TFSI] mixed with water.
Figure 6B:
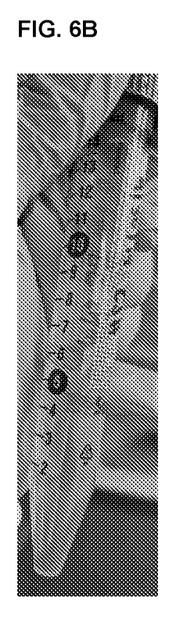
FIG. 6B shows the centrifuged precipitate from the solution in FIG. 6A.

It was discovered adding water to a low concentration $UF_6$ solution accelerated the formation of a precipitate through the removal of F⁻ from the dissolved species. In a 15 mL centrifuge vial, 2.93 mL of the 0.21 M $UF_6$ solution was combined with 3.0 mL of deionized $H_2O$. The tube was placed on a microplate genie and mixed for 1 hour. The mixture was then centrifuged for 15 minutes at 5500 rpm. A green solid precipitate was observed primarily at the bottom of the vial. There was a small amount of precipitate in the layer between the water and [MPPi][TFSI]. A similar centrifuge tube before and after centrifugation is shown in FIG. 6A-B.

Figure 6C:
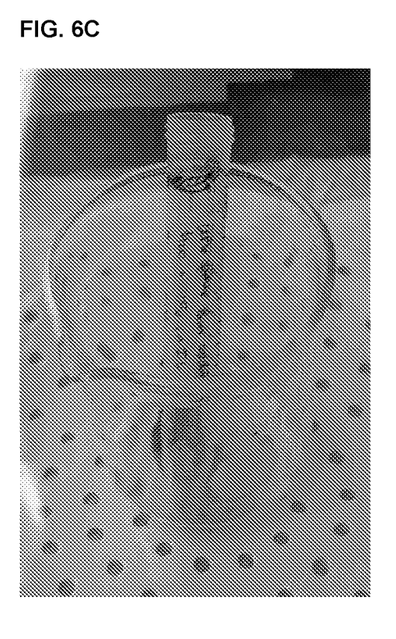
FIG. 6C shows the precipitate after rinsing with acetone and drying overnight at room temperature in a fume hood. The precipitate changed from a dark green to light green color when dried.

A majority of the aqueous and [MPPi][TFSI] layers were removed via pipet for analysis of the remaining uranium. The precipitate was vacuum filtered from the remaining solutions. Acetone was used to rinse the solid to remove the bulk of the [MPPi][TFSI]. The filter paper was removed from the filter and placed under vacuum to dry overnight. The precipitate changed from a dark green to a light green color when dried as shown in FIG. 6C.

Figure 7:
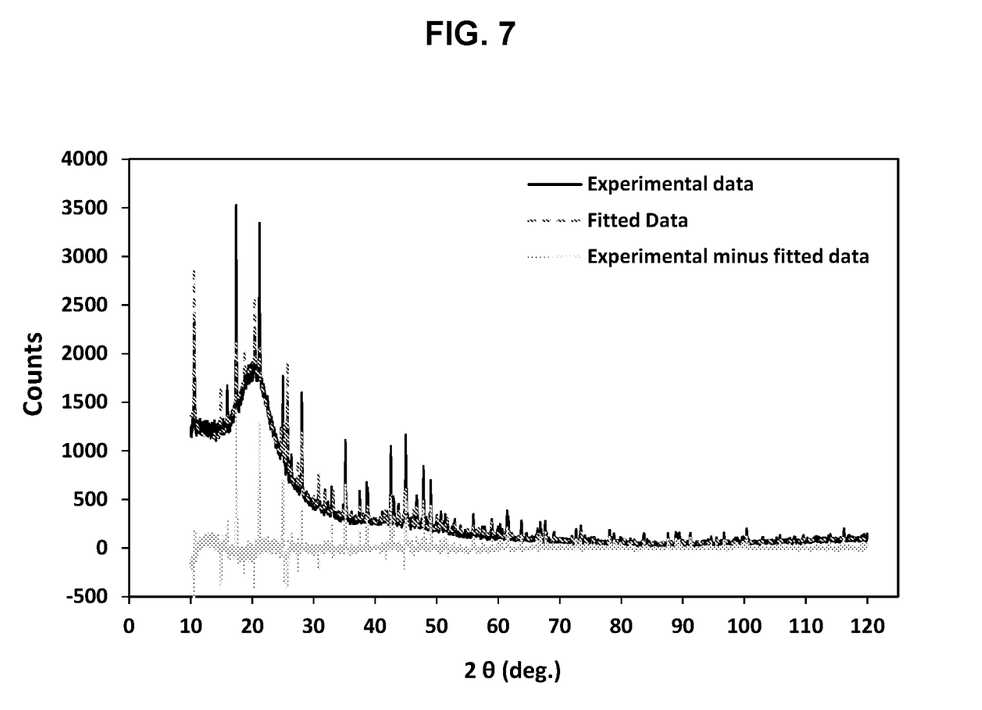
FIG. 7 shows an XRPD profile of the green precipitate of FIG. 6C having features for hydrated UF$_4$.

The mass of recovered precipitate was 0.1404 g. PXRD (FIG. 7) and TGA analysis showed the precipitate to be $UF_4 \cdot 2.5\ H_2O$. This is a precipitate recovery of 31.6%. ICP-AES of the aqueous phase found 31.6% of the water present. UV-Vis of the aqueous phase shows the five-finger signature of $UO_2^{2+}$. A mixture of the [MPPi][TFSI] with deionized water was incubated overnight to extract any remaining uranium from the organic phase. ICP-AES of the secondary aqueous phase showed less than 0.5% of the uranium remains in the [MPPi][TFSI].

After heating to 1300° C., the hydrated $UF_4$ was $U_3O_8$.

What is claimed:

1. A method for converting uranium hexafluoride ($UF_6$) to uranium tetrafluoride ($UF_4$), comprising:
   reductively dissolving $UF_6$ directly into a room temperature ionic liquid at concentrations of 0.01 M to 0.4 M;
   incubating the solution for a period of time at room temperature; and
   adding water to the solution to precipitate solid $UF_4$.

2. The method of claim 1, wherein the $UF_6$ concentration in the ionic liquid is less than 0.4 M.

3. The method of claim 1, wherein the $UF_6$ concentration in the ionic liquid is selected from 0.01 M, 0.02 M, 0.03 M, 0.04 M, 0.05 M, 0.06 M, 0.07 M, 0.08 M, 0.09 M, 0.01 M, 0.02 M, 0.03 M, 0.04 M, 0.05 M, 0.06 M, 0.07 M, 0.08 M, 0.09 M, 0.1 M, 0.2 M, 0.3 M, or 0.4 M.

4. The method of claim 1, further comprising chilling the $UF_6$ prior to dissolving the $UF_6$ in the ionic liquid.

5. The method of claim 1, wherein the period of time comprises about 1 hour to about 200 days.

6. The method of claim 1, wherein the period of time comprises about 1 hour to about 1 day.

7. The method of claim 1, wherein the ionic liquid comprises an anion with a lone pair of electrons.

8. The method of claim 1, wherein the ionic liquid comprises an anion selected from the group consisting of n-bis(trifluoromethanesulfonylimide) (TFSI), dicyanomide, trifluoroacetate, alkyl sulfonates, alkyl sulfates, bis(fluorosulfonyl)imide and trifluoromethylacetate.

9. The method of claim 1, wherein the ionic liquid comprises n-bis(trifluoromethanesulfonylimide) anion (TFSI$^-$).

10. The method of claim 1, wherein the ionic liquid comprises a cation selected from the group consisting of alkyl-substituted or unsubstituted ammonium cations, alkyl-substituted or unsubstituted piperidinium cations, and alkyl-substituted or unsubstituted pyrrolidinium cations.

11. The method of claim 1, wherein the ionic liquid comprises a cation selected from the group consisting of tetraalkylammonium cation, a dialkylpiperidinium cation, and dialkylpyrrolidinium cation.

12. The method of claim 1, wherein the ionic liquid comprises 1-methyl-1-propyl piperidinium cation.

13. The method of claim 1, wherein the ionic liquid comprises 1-methyl-1-propyl piperidinium bis(trifluoromethanesulfonylimide) ([MPPi][TFSI]).

14. The method of claim 1, wherein the recovery of $UF_4$ is approximately 100%.

\* \* \* \* \*